United States Patent
Hulseman et al.

(10) Patent No.: US 10,889,005 B2
(45) Date of Patent: *Jan. 12, 2021

(54) MICROSTRUCTURE ARRANGEMENT FOR GRIPPING LOW COEFFICIENT OF FRICTION MATERIALS

(71) Applicant: Hoowaki, LLC, Greenville, SC (US)

(72) Inventors: Ralph A. Hulseman, Greenville, SC (US); Cameron L. McPherson, Easley, SC (US); Nakul Ravikumar, Greenville, SC (US)

(73) Assignee: Hoowaki LLC, Greenville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/451,741

(22) Filed: Jun. 25, 2019

(65) Prior Publication Data
US 2019/0314999 A1    Oct. 17, 2019

Related U.S. Application Data

(63) Continuation of application No. 15/674,291, filed on Aug. 10, 2017, now Pat. No. 10,377,044.

(60) Provisional application No. 62/372,896, filed on Aug. 10, 2016.

(51) Int. Cl.
*B25J 15/00* (2006.01)
*B22F 7/08* (2006.01)
*B22F 5/00* (2006.01)

(52) U.S. Cl.
CPC .............. *B25J 15/0028* (2013.01); *B22F 5/00* (2013.01); *B22F 7/08* (2013.01); *B22F 2005/005* (2013.01)

(58) Field of Classification Search
CPC . Y10T 428/24479; Y10T 428/14; B32B 3/30; B32B 3/00; B32B 3/28; B32B 3/02; B32B 3/10; B32B 3/08; B32B 3/085; B32B 2307/744; B32B 2307/746; B25J 15/0028; B25J 15/0061
See application file for complete search history.

(56) References Cited

U.S. PATENT DOCUMENTS

| | | | |
|---|---|---|---|
| 6,872,439 B2 | 3/2005 | Fearing et al. | |
| 9,120,670 B2* | 9/2015 | Hulseman | ........... B81C 99/0015 |
| 10,377,044 B2* | 8/2019 | Hulseman | ............ B25J 15/0028 |

(Continued)

OTHER PUBLICATIONS

International Search Report and Written Opinion for PCT/US2017/46357.

*Primary Examiner* — Catherine A. Simone
(74) *Attorney, Agent, or Firm* — Kim and Lahey Law Firm LLC; Seann P. Lahey; Douglas W. Kim

(57) ABSTRACT

A microstructure arrangement for gripping low coefficient material comprising: a substrate disposed on a gripping surface; a set of pillars disposed on the substrate; and, wherein the set of pillars have the physical property of a grip force in excess of 50.0N with a contact area of 25% or less as determined by the friction testing method. A first set of pillars can be disposed on the substrate having a cross section area in the range of 100 μm² to 160,000 μm², height relative to the substrate in the range of 10 μm to 400 μm, and a pitch determined from the center of the pillars, in the range of 20 μm to 1000 μm; and a secondary set of pillars disposed on the first set of pillars having a cross section area less than that of the pillars in the first set of pillars.

12 Claims, 17 Drawing Sheets

(56) References Cited

U.S. PATENT DOCUMENTS

| | | |
|---|---|---|
| 2002/0114920 A1 | 8/2002 | Scholz |
| 2005/0148984 A1 | 7/2005 | Lindsay et al. |
| 2010/0319183 A1 | 12/2010 | Hulseman |
| 2012/0011685 A1 | 1/2012 | Rocha |
| 2012/0027990 A1 | 2/2012 | Kobe |
| 2014/0276407 A1 | 9/2014 | DeVries |
| 2015/0159067 A1 | 6/2015 | Pesike |
| 2015/0368838 A1 | 12/2015 | Hulseman |

\* cited by examiner

| Pattern / Contact % | | PTFE 60 Shore D | | | | | | SBR 60 Shore A | | | | | |
|---|---|---|---|---|---|---|---|---|---|---|---|---|---|
| | | Trial 1 | Trial 2 | Trial 3 | Average | SD | μ | Trial 1 | Trial 2 | Trial 3 | Average | SD | μ |
| H374AP (H003AP 0.45%) | 0.45 | 18.88 | 19.84 | 19.71 | 19.5 | 0.4 | 1.0 | 21.7 | 21 | 23.9 | 22.2 | 1.2 | 1.1 |
| H375AP (H003AP 0.9%) | 0.9 | 16.21 | 16.96 | 15.92 | 16.4 | 0.4 | 0.8 | 23 | 22.7 | 23.7 | 23.1 | 0.4 | 1.2 |
| H376AP (H003AP 2%) | 2 | 15.7 | 16.12 | 17.05 | 16.3 | 0.6 | 0.8 | 26.2 | 26.9 | 24.3 | 25.8 | 1.1 | 1.3 |
| H377AP (H003AP 3%) | 3 | 17.12 | 16.22 | 16.73 | 16.7 | 0.4 | 0.8 | 24.2 | 24.1 | 25.5 | 24.6 | 0.6 | 1.2 |
| H378AP (H003AP 5%) | 5 | 15.8 | 15.28 | 15.83 | 15.6 | 0.3 | 0.8 | 26.9 | 24.9 | 23.6 | 25.1 | 1.4 | 1.3 |
| H379AP (H003AP 9.8%) | 9.8 | 19.98 | 15.86 | 16.16 | 17.3 | 1.9 | 0.9 | 24 | 23.4 | 23.2 | 23.5 | 0.3 | 1.2 |
| Blank 100% | 100 | 4.49 | 4.64 | 4.97 | 4.7 | 0.2 | 0.2 | 18.1 | 16.3 | 17.2 | 17.2 | 0.7 | 0.9 |

FIGURE 6A

| Pattern / Contact % | | Nylon | | | | | | NuSil | | | | | |
|---|---|---|---|---|---|---|---|---|---|---|---|---|---|
| | | Trial 1 | Trial 2 | Trial 3 | Average | SD | μ | Trial 1 | Trial 2 | Trial 3 | Average | SD | μ |
| H374AP (H003AP 0.45%) | 0.45 | 26.37 | 27.38 | 28.21 | 27.3 | 0.8 | 1.4 | 18.7 | 19.5 | 22.6 | 20.3 | 1.7 | 1.0 |
| H375AP (H003AP 0.9%) | 0.9 | 22.12 | 20.71 | 22.92 | 21.9 | 0.9 | 1.1 | 20.9 | 19.5 | 20.8 | 20.4 | 0.6 | 1.0 |
| H376AP (H003AP 2%) | 2 | 19.73 | 19.14 | 20.21 | 19.7 | 0.4 | 1.0 | 23.5 | 23.6 | 22.2 | 23.1 | 0.6 | 1.2 |
| H377AP (H003AP 3%) | 3 | 19.24 | 18.37 | 18.81 | 18.8 | 0.4 | 0.9 | 23.8 | 23.3 | 26.6 | 24.6 | 1.5 | 1.2 |
| H378AP (H003AP 5%) | 5 | 15.65 | 15.82 | 16.45 | 16.0 | 0.3 | 0.8 | 22.3 | 23.2 | 22.5 | 22.7 | 0.4 | 1.1 |
| H379AP (H003AP 9.8%) | 9.8 | 20.06 | 19.76 | 17.04 | 19.0 | 1.4 | 0.9 | 22.6 | 24.6 | 22.5 | 23.2 | 1.0 | 1.2 |
| Blank 100% | 100 | 6.64 | 6.71 | 6.8 | 6.7 | 0.1 | 0.3 | 24.4 | 24.3 | 23.6 | 24.1 | 0.4 | 1.2 |

FIGURE 6B

| Pattern/Material | | PTFE 60 Shore D | | | | | | SBR 60 Shore A | | | | | |
|---|---|---|---|---|---|---|---|---|---|---|---|---|---|
| | | Trial 1 | Trial 2 | Trial 3 | Average | SD | μ | Trial 1 | Trial 2 | Trial 3 | Average | SD | μ |
| H374AP (H003AP 0.45%) | 0.45 | 34.9 | 34.44 | 42.9 | 37.4 | 3.9 | 0.7 | 67.1 | 65.6 | 63.4 | 65.4 | 1.5 | 1.3 |
| H375AP (H003AP 0.9%) | 0.9 | 53.67 | 45.36 | 46.93 | 48.7 | 3.6 | 1.0 | 61 | 60.9 | 58.1 | 60.0 | 1.3 | 1.2 |
| H376AP (H003AP 2%) | 2 | 45.08 | 39.13 | 42.28 | 42.2 | 2.4 | 0.8 | 71.5 | 70.9 | 71.5 | 71.3 | 0.3 | 1.4 |
| H377AP (H003AP 3%) | 3 | 37.62 | 36.39 | 39.58 | 37.9 | 1.3 | 0.8 | 68 | 67.5 | 65.6 | 67.0 | 1.0 | 1.3 |
| H378AP (H003AP 5%) | 5 | 34.24 | 34.28 | 35.41 | 34.6 | 0.5 | 0.7 | 67.6 | 67.3 | 66.1 | 67.0 | 0.6 | 1.3 |
| H379AP (H003AP 9.8%) | 9.8 | 38.32 | 40.45 | 43.76 | 40.8 | 2.2 | 0.8 | 66.8 | 64.7 | 61.9 | 64.5 | 2.0 | 1.3 |
| Blank 100% | 100 | 15.45 | 16.8 | 14.95 | 15.7 | 0.8 | 0.3 | 48.3 | 51.9 | 51.2 | 50.5 | 1.6 | 1.0 |

FIGURE 6C

| Pattern/Material | | Nylon | | | | | | NuSil | | | | | |
|---|---|---|---|---|---|---|---|---|---|---|---|---|---|
| | | Trial 1 | Trial 2 | Trial 3 | Average | SD | $\mu$ | Trial 1 | Trial 2 | Trial 3 | Average | SD | $\mu$ |
| H374AP (H003AP 0.45%) | 0.45 | 53.99 | 53.98 | 52.88 | 53.6 | 0.5 | 1.1 | 43.9 | 45.6 | 46.2 | 45.2 | 1.0 | 0.9 |
| H375AP (H003AP 0.9%) | 0.9 | 52.95 | 54.53 | 54.84 | 54.1 | 0.8 | 1.1 | 45.8 | 48 | 50.8 | 48.2 | 2.0 | 1.0 |
| H376AP (H003AP 2%) | 2 | 44.87 | 44.35 | 44.54 | 44.6 | 0.2 | 0.9 | 54 | 55 | 57.2 | 55.4 | 1.3 | 1.1 |
| H377AP (H003AP 3%) | 3 | 39.94 | 40.47 | 39.57 | 40.0 | 0.4 | 0.8 | 53.7 | 55.2 | 56.3 | 55.1 | 1.1 | 1.1 |
| H378AP (H003AP 5%) | 5 | 40.35 | 39.37 | 50.57 | 43.4 | 5.1 | 0.9 | 55.1 | 56.4 | 57.5 | 56.3 | 1.0 | 1.1 |
| H379AP (H003AP 9.8%) | 9.8 | 41.89 | 41 | 43.58 | 42.2 | 1.1 | 0.8 | 57.5 | 60.7 | 62.3 | 60.2 | 2.0 | 1.2 |
| Blank 100% | 100 | 12.97 | 13.43 | 14.39 | 13.6 | 0.6 | 0.3 | 65.9 | 63.7 | 62.2 | 63.9 | 1.5 | 1.3 |

FIGURE 6D

| Pattern/Material | | PTFE 60 Shore D | | | | | | SBR 60 Shore A | | | | | |
|---|---|---|---|---|---|---|---|---|---|---|---|---|---|
| | | Trial 1 | Trial 2 | Trial 3 | Average | SD | μ | Trial 1 | Trial 2 | Trial 3 | Average | SD | μ |
| H374AP (H003AP 0.45%) | 0.45 | 53.04 | 53.12 | 54.36 | 53.5 | 0.6 | 0.7 | 105.5 | 105.3 | 103.5 | 104.8 | 0.9 | 1.3 |
| H375AP (H003AP 0.9%) | 0.9 | 63.23 | 72.09 | 87.52 | 74.3 | 10.0 | 0.9 | 98.6 | 98.4 | 94.8 | 97.3 | 1.7 | 1.2 |
| H376AP (H003AP 2%) | 2 | 68.58 | 69.76 | 78.11 | 72.2 | 4.2 | 0.9 | 113.2 | 110.9 | 108.9 | 111.0 | 1.8 | 1.4 |
| H377AP (H003AP 3%) | 3 | 63.9 | 66.75 | 70.88 | 67.2 | 2.9 | 0.8 | 105.5 | 106.7 | 102.6 | 104.9 | 1.7 | 1.3 |
| H378AP (H003AP 5%) | 5 | 52.83 | 52.1 | 54.89 | 53.3 | 1.2 | 0.7 | 111.3 | 106.3 | 103.6 | 107.1 | 3.2 | 1.3 |
| H379AP (H003AP 9.8%) | 9.8 | 59.34 | 60.11 | 61.51 | 60.3 | 0.9 | 0.8 | 109.3 | 107.8 | 102.4 | 106.5 | 3.0 | 1.3 |
| Blank 100% | 100 | 23.2 | 23.57 | 27.3 | 24.7 | 1.9 | 0.3 | 86.8 | 87.1 | 81.2 | 85.0 | 2.7 | 1.1 |

FIGURE 6E

| Pattern/Material | | Nylon | | | | | | NuSil | | | | | |
|---|---|---|---|---|---|---|---|---|---|---|---|---|---|
| | | Trial 1 | Trial 2 | Trial 3 | Average | SD | $\mu$ | Trial 1 | Trial 2 | Trial 3 | Average | SD | $\mu$ |
| H374AP (H003AP 0.45%) | 0.45 | 75.24 | 73.79 | 74.6 | 74.5 | 0.6 | 0.9 | 71.9 | 74.8 | 78 | 74.9 | 2.5 | 0.9 |
| H375AP (H003AP 0.9%) | 0.9 | 86.8 | 77.31 | 80.26 | 81.5 | 4.0 | 1.0 | 72.4 | 74.3 | 77.9 | 74.9 | 2.3 | 0.9 |
| H376AP (H003AP 2%) | 2 | 67.62 | 64.05 | 62.79 | 64.8 | 2.0 | 0.8 | 92.8 | 87.7 | 88.1 | 89.5 | 2.3 | 1.1 |
| H377AP (H003AP 3%) | 3 | 59.81 | 61.05 | 60.37 | 60.4 | 0.5 | 0.8 | 77.6 | 78.8 | 80.9 | 79.1 | 1.4 | 1.0 |
| H378AP (H003AP 5%) | 5 | 61.22 | 61.56 | 61.94 | 61.6 | 0.3 | 0.8 | 87 | 88.7 | 92.1 | 89.3 | 2.1 | 1.1 |
| H379AP (H003AP 9.8%) | 9.8 | 69.22 | 63.72 | 63.9 | 65.6 | 2.6 | 0.8 | 90.6 | 92.9 | 96.6 | 93.4 | 2.5 | 1.2 |
| Blank 100% | 100 | 23.14 | 22.13 | 22.4 | 22.6 | 0.4 | 0.3 | 69.9 | 69.3 | 66 | 68.4 | 1.7 | 0.9 |

FIGURE 6F

| Pattern/Material | | PTFE 60 Shore D | | | | | | Nylon | | | | | |
|---|---|---|---|---|---|---|---|---|---|---|---|---|---|
| | | Trial 1 | Trial 2 | Trial 3 | Average | SD | μ | Trial 1 | Trial 2 | Trial 3 | Average | SD | μ |
| H374AP (H003AP 0.45%) | 0.45 | 71.54 | 69.91 | 68.71 | 70.1 | 1.2 | 0.6 | 91.46 | 89.7 | 90.72 | 90.6 | 0.7 | 0.8 |
| H375AP (H003AP 0.9%) | 0.9 | 74.37 | 82.12 | 93.86 | 83.5 | 8.0 | 0.8 | 97.78 | 92.06 | 95.05 | 95.0 | 2.3 | 0.9 |
| H376AP (H003AP 2%) | 2 | 88.94 | 96.14 | 104 | 96.4 | 6.2 | 0.9 | 91.01 | 88.85 | 91.59 | 90.5 | 1.2 | 0.8 |
| H377AP (H003AP 3%) | 3 | 86.35 | 88.38 | 88.79 | 87.8 | 1.1 | 0.8 | 81.3 | 80.9 | 81.07 | 81.1 | 0.2 | 0.7 |
| H378AP (H003AP 5%) | 5 | 74.97 | 74.1 | 74.99 | 74.7 | 0.4 | 0.7 | 84.04 | 82.77 | 83.91 | 83.6 | 0.6 | 0.8 |
| H379AP (H003AP 9.8%) | 9.8 | 85.05 | 83.46 | 83.59 | 84.0 | 0.7 | 0.8 | 77.83 | 77.5 | 80.01 | 78.4 | 1.1 | 0.7 |
| Blank 100% | 100 | 25.12 | 25.24 | 28.06 | 26.1 | 1.4 | 0.2 | 32.63 | 33.58 | 32.26 | 32.8 | 0.6 | 0.3 |

FIGURE 6G

| Pattern/Material | PTFE 60 Shore D | | | | | | Nylon | | | | | |
|---|---|---|---|---|---|---|---|---|---|---|---|---|
| | Trial 1 | Trial 2 | Trial 3 | Average | SD | $\mu$ | Trial 1 | Trial 2 | Trial 3 | Average | SD | $\mu$ |
| H374AP (H003AP 0.45%) 0.45 | 84 | 86.08 | 86.33 | 85.5 | 1.0 | 0.6 | 107.7 | 107.1 | 109.4 | 108.1 | 1.0 | 0.8 |
| H375AP (H003AP 0.9%) 0.9 | 95.31 | 101.2 | 110.8 | 102.4 | 6.4 | 0.7 | 104.8 | 104.2 | 103.7 | 104.2 | 0.4 | 0.7 |
| H376AP (H003AP 2%) 2 | 104.4 | 113.8 | 128.8 | 115.7 | 10.0 | 0.8 | 112.9 | 111.6 | 113.8 | 112.8 | 0.9 | 0.8 |
| H377AP (H003AP 3%) 3 | 97.21 | 99.86 | 104.4 | 100.5 | 3.0 | 0.7 | 97.88 | 96.56 | 97.27 | 97.2 | 0.5 | 0.7 |
| H378AP (H003AP 5%) 5 | 92.67 | 91.28 | 94.45 | 92.8 | 1.3 | 0.7 | 112 | 99.71 | 100.1 | 103.9 | 5.7 | 0.7 |
| H379AP (H003AP 9.8%) 9.8 | 98.34 | 98.69 | 104 | 100.3 | 2.6 | 0.7 | 109.8 | 106 | 108.1 | 108.0 | 1.6 | 0.8 |
| Blank 100% 100 | 29.6 | 30.35 | 33.71 | 31.2 | 1.8 | 0.2 | 53.08 | 50.33 | 49.46 | 51.0 | 1.5 | 0.4 |

FIGURE 6H

MICROSTRUCTURE ARRANGEMENT FOR GRIPPING LOW COEFFICIENT OF FRICTION MATERIALS

BACKGROUND OF THE INVENTION

The present invention relates to microstructure patterns, and more particularly, to a gripping surface having a microstructure pattern adapted for improving grip on low coefficient of friction materials.

Polymer materials with low coefficient of friction (COF), such as PTFE, HDPE, nylon or POM, are manufactured into devices to allow easy sliding of devices with or without a lubricant being present. Typical examples include a PTFE shaft seal sliding against a polycarbonate housing; a nylon covered vascular catheter sliding through a polypropylene introducer tube, or a PTFE coated guide wire sliding inside a PTFE lined vascular catheter. However, these low COF items must also be gripped during manufacturing, or during use, or during disassembly and disposal. Particularly during manufacturing and use, gripping the item must be done carefully to prevent causing damage or degradation, such as creating scratches or generating contaminating particles. During high volume manufacturing, automated gripping of these materials is desirable. Current solutions for gripping low COF materials are cumbersome and require mechanical methods such as holes, slots or threads; or they accept low levels of grip force and delicate operations. It is also difficult to grip low COF rubbery polymers such as silicone rubber or human skin. Previous attempts to address these problems include unsatisfactory use of additives that results in "sticky" surfaces or use adhesives which are undesirable as they can be too sticky, create unnecessarily rough surfaces, and can cause pain to the user. The unmodified material can have a COF of 0.2 or less.

Accordingly, it is an object of the present invention to provide a microstructure arrangement on a gripping surface capable of firmly gripping low COF materials without causing damage to the material.

SUMMARY OF THE INVENTION

Gripping, moving and manipulating devices made of low COF polymer by devices with a gripping pad is improved by forming a pattern of microstructure features according to the present invention on at least one surface of the gripping pad. Coefficient of friction greater than 0.90 was achieved using patterns of microstructure arrays covering the gripping pad and molded in a material with a Young's modulus greater than the Young's modulus of the material being gripped. Microstructures having a width greater than 2 microns and less than 500 microns were the most effective at providing grip on low COF materials such as PTFE. Some of the most effective gripping occurred when contact is less than about 25% and greater than about 0.25%. The microstructure features can further consist of one array stacked on another array of larger microstructure features, which further improves grip.

The invention can include a microstructure arrangement for gripping low coefficient material comprising: a substrate disposed on a gripping surface wherein the unmodified substrate has a coefficient of friction relative to a polymer against steel of 0.2 or less; a first set of pillars disposed on the substrate having a cross section area per pillar in the range of 10 $\mu m^2$ to 400 $\mu m^2$, height relative to the substrate in the range of 10 $\mu m$ to 400 $\mu m$, and a pitch determined from the center of the pillars in the range of 20 $\mu m$ to 1000 $\mu m$; a secondary set of pillars disposed on the first set of pillars having a cross section area less than that of the pillars in the first set of pillars; and, wherein the first set of pillars and the second set of pillars are configured to cooperate to have the physical property of a grip force in excess of 50.0N with a contact area of 25% or less as determined by the friction testing method. The contact area is defined as the area of the outermost top surface of the outmost set of pillars. This is the area in contact if a rigid flat plaque of material is brought in contact with the micro pattern surface under low pressure. The grip force can be in excess of 55.0N with a contact area of 20% or less. The first set of pillars and the second set of pillars can be configured to cooperate to have the physical property touch aesthetic that are painless and prickly as determine by the tactile testing method. The grip force can exceed 60.0N with a contact area of 10% or less. The first set of pillars and the second set of pillars can be configured to cooperate to have a coefficient of friction in the range of 0.7 to 0.9 when the substrate is PTFE. The first set of pillars and the second set of pillars can be configured to cooperate to have a coefficient of friction greater than 3.4 times smooth PTFE. The first set of pillars and the second set of pillars can be configured to cooperate to have a coefficient of friction in the range of 1.0 to 1.4 when the substrate is SBR. The first set of pillars and the second set of pillars can be configured to cooperate to have a coefficient of friction greater than 1.1 times smooth SBR. The first set of pillars and the second set of pillars can be configured to cooperate to have a coefficient of friction in the range of 0.8 to 1.0 when the substrate is nylon. The first set of pillars can be arranged in a rectangular lattice or triangular lattice. The secondary pattern can be disposed on top of the primary pillars in a consistent pattern of one that varies from pillar to pillar.

BRIEF DESCRIPTION OF THE DRAWINGS

The construction designed to carry out the invention will hereinafter be described, together with other features thereof. The invention will be more readily understood from reading the following specification and by reference to the accompanying drawings forming a part thereof, wherein an example of the invention is shown and wherein:

FIGS. 6A to 6B show testing results with a 20N force applied to a testing sample;

FIGS. 6C to 6D show testing results with a 50N force applied to a testing sample;

FIGS. 6E to 6F show testing results with an 80N force applied to a testing sample;

FIG. 6G shows testing results with a 110N force applied to a testing sample;

FIG. 6H shows testing results with a 140N force applied to a testing sample;

Figure 1A:
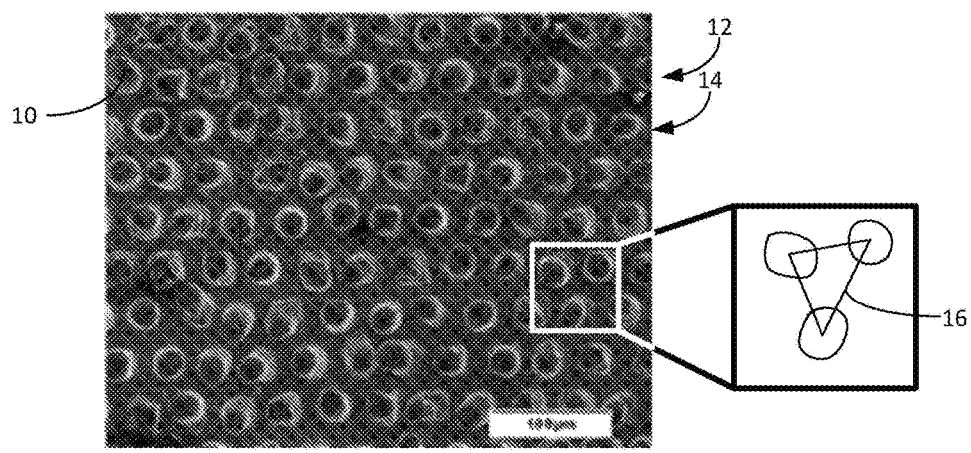
FIGS. 1A-1F shows micrograph images of a microstructure arrangement including a plurality of pillars on a gripping surface material according to the present invention.

It will be understood by those skilled in the art that one or more aspects of this invention can meet certain objectives, while one or more other aspects can meet certain other objectives. Each objective may not apply equally, in all its respects, to every aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

According to the present invention, the microstructure arrangements detailed herein are applied, in one embodiment, to a gripping pad made of a high modulus material. The gripping pad can have a higher Young's modulus than the material to be gripped. At least one outer surface of the gripping pad contains a microstructure pattern consisting of, for example, micro pillar structures, or alternative microstructure recesses, that exhibit high grip and high coefficient of friction (COF) to plastic polymer materials that have low COF such as polytetrafluoroethylene (PTFE) or to low COF rubber polymers such as silicone rubber or human skin.

In one embodiment, the microstructure pattern may be formed in a pad of steel, with a resulting increase in COF of steel to PTFE from 0.2 to over 0.8.

In one embodiment, the microstructure pattern may be formed in a pad of high modulus polymer, such as polyester terephthalate (Mylar) or modified polyester terephthalate (Dupont Hytrel or Eastman Tritan), with a resulting increase in COF of polyester terephthalate to PTFE from about 0.04 to over 1.00 without visible damage to the PTFE. These materials are provided by way of example only, as the microstructure arrangements according to the present invention can be included in various other materials as would be understood by a person of ordinary skill in the art.

The microstructure pattern described and illustrated herein may be formed in a pad of steel or high modulus polymer that grips any lower modulus polymer material with a COF greater than 0.8 without visible damage.

The microstructure pattern described and illustrated herein may be formed in a pad of steel or high modulus polymer that grips biopolymers including skin with pull force greater than 50 Newtons without visible damage or the perception of pain.

The microstructure pattern described and illustrated herein may be formed in a pad of steel or high modulus polymer that grips textiles and fabric with a COF greater than 1.00 without visible damage to the fabric.

In one embodiment, the microstructure pattern includes micro pillars with an angle of orientation to a film base material of greater than 75 degrees, and preferred greater than 85 degrees.

In illustrated embodiments, referring to FIGS. 1A-1G, the microstructure pattern includes primary microstructure features defined by pillars that may be of a cross section that is circular, square, triangular, circular fluted, rectangular or other geometric shapes, and combinations thereof. The illustrated embodiments described herein are provided by way of example only, and are not limiting of the various geometric shapes that may be utilized in the present invention.

In one embodiment, the microstructure pattern includes micro pillars that include an upper end that may be flat, rounded, spherical, pyramidal or have smaller pillars on the end surface of the larger pillar, such as illustrated in FIGS. 2A-2F. The stacked arrangement is particularly useful in gripping skin, rubber and other softer materials.

Figure 2A:
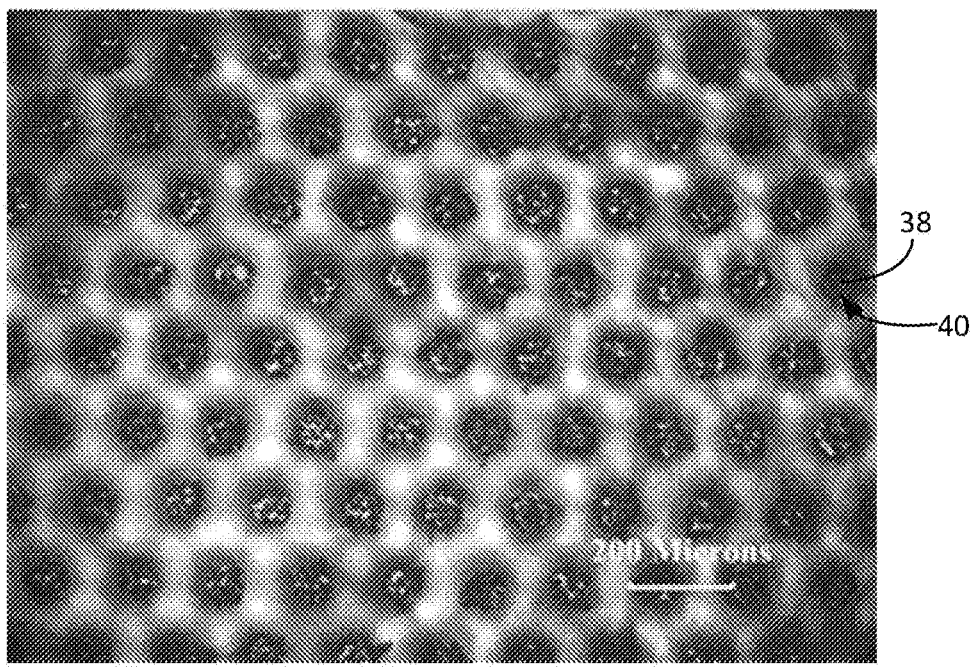
FIGS. 2A-2B shows micrograph images of a microstructure arrangement including a plurality of primary microstructure pillars carrying a plurality of secondary microstructure pillars on a gripping surface material according to the present invention.
Figure 2B:
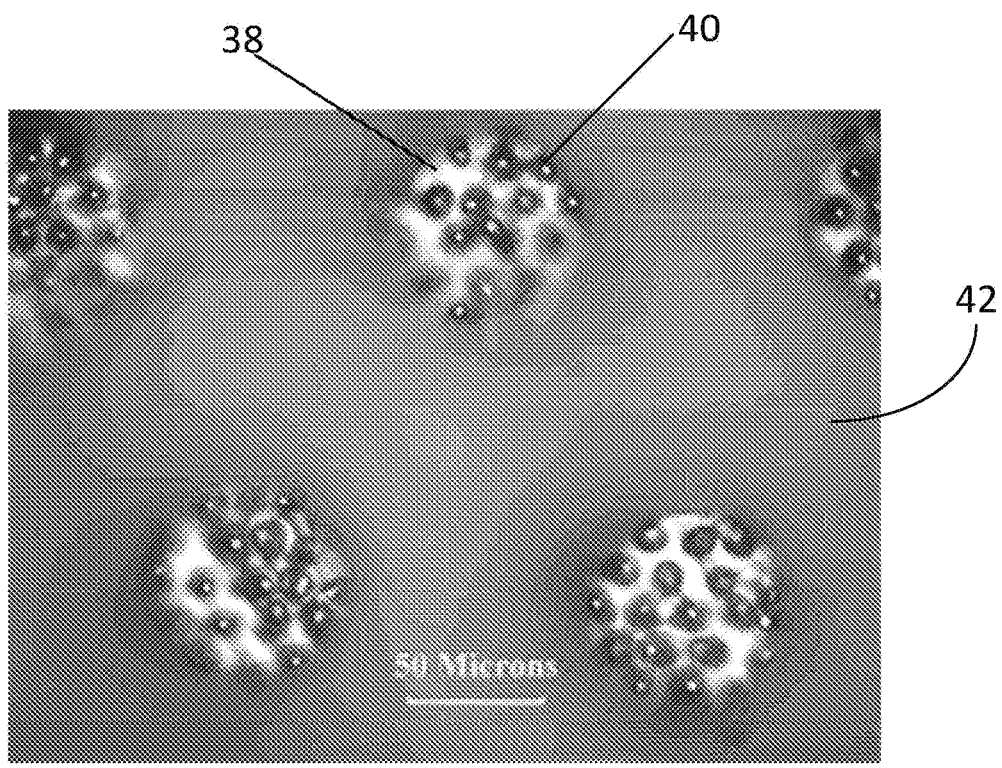

Referring to FIGS. 2A-2B, in the illustrated embodiments, the microstructure pattern includes a primary microstructure with a secondary microstructure feature carried on top of the primary microstructure feature. In the embodiment shown in FIGS. 2A-2B, the secondary microstructure 40 is defined by smaller pillars covering the tops of larger pillars defining the primary microstructure 38. In one embodiment, the smaller pillars may have a cross section width from 0.5 to 100 microns, a height above the end of the primary pillar from 1 to 100 microns tall, and a center to center pitch of 1 to 200 microns, oriented in a triangular, rectangular or random distribution, or combinations thereof, over the outer end surface of the larger pillar. The illustrated embodiments described herein are provided by way of example only, and are not limiting of the various geometric shapes that may be utilized in defining the primary and secondary microstructures of the present invention.

In one embodiment, the microstructure pattern will cover greater than 25% of the outer surface area of at least one side of the gripping pad.

The microstructure pattern can be formed on a variety of gripping pad surfaces for a variety of applications, including, for example, on a single or pair of rotating wheels to provide grip, on finger tips or palms of gloves, on brake pads and brake drums or rotors, on clutch plates, on jaws of pliers, graspers, retractors and similar squeezing instruments, on robotic surgical tools or laparoscopic surgical tools. The gripping pad surfaces can be in the form of tapes and films for wrapping handles or for adhering to surfaces and they can be molded forms such as handles of tools. The gripping pads can be molded for articles that can include handles, grips, labels, closures, utensils, and similar objects that can be gripped by hand or with a hand covering such as a glove. The gripping pads may be sewn to or molded into gloves, luggage grip, backpack straps and similar items. The gripping pads may be molded or printed on labels and containers. These are but a few examples of the possible application of the microstructure pattern detailed herein.

Low COF polymers to which the microstructure pattern can be applied to improve grip include, but are not limited to, PTFE, HDPE, PE, PP, nylon, PET or any similar plastic polymer, silicone rubber, isoprene rubber, thermoplastic elastomers, polyurethane rubbers or any similar rubber polymer. These low COF polymers can have a COF against smooth steel less than 0.2, however, a gripping pad including a microstructure pattern according to the present invention can securely grip and hold such materials.

Preferably, the primary microstructures (and secondary microstructures in a stacked array embodiment) have a uniform height from the film base so that a uniform pressure is applied against the surface of the material to be gripped. This prevents damage to the material while providing optimal grip by allowing all of the microstructure ends to engage the material in a uniform engagement.

Table 1 below lists dimensional specifications of the patterns tested directed to certain arrangements of micro patterns on gripping surface.

| Pattern ID | SIZE (μm) | SHAPE (pillar unless otherwise noted) | PITCH(μm) | LATTICE | DEPTH (μm) | % Contact |
|---|---|---|---|---|---|---|
| H190AP | 200 | circular | 500 | rectangular | 600 | 12.6% |
| H185AP | 100 | circular | 700 | rectangular | 200 | 1.6% |
| H191AP | 150 | circular | 450 | rectangular | 450 | 8.7% |
| H282AP | 25 × 50 | elipse | 150 | rectangular | 70 | 5.6% |
| H034AP | 30 | circular | 85 | rectangular | 40 | 9.8% |
| H037AP | 50 | circular | 140 | rectangular | 40 | 10.0% |
| H002AP | 50 | circular | 100 | rectangular | 70 | 19.6% |
| H003AP | 50 × 25 | oval | 100 | rectangular | 70 | 9.8% |
| H012CP | 25 | square | 50 | triangular | 50 | 25.0% |
| H008AP | 200 | circular | 400 | triangular | 350 | 22.7% |
| H008AH | 200 | circular (holes) | 400 | triangular | 350 | 77.3% |
| H009AP | 100 | circular | 200 | triangular | 200 | 22.7% |
| H021AP | 100 | square | 350 | triangular | 400 | 9.4% |
| H160AP | 10 + 100 | circular | 20 + 200 | triangular | 20 + 200 | 5.0% |
| H374AP | 41 × 20.5 + 200 | oval & square | 82 + 933 | rectangular | 57.4 + 100 | 0.5% |
| H375AP | 41 × 20.5 + 200 | oval & square | 82 + 660 | rectangular | 57.4 + 100 | 0.9% |
| H376AP | 41 × 20.5 + 200 | oval & square | 82 + 443 | rectangular | 57.4 + 100 | 2.0% |
| H377AP | 41 × 20.5 + 200 | oval & square | 82 + 362 | rectangular | 57.4 + 100 | 3.0% |
| H378AP | 41 × 20.5 + 200 | oval & square | 82 + 280 | rectangular | 57.4 + 100 | 5.0% |
| H379AP | 41 × 20.5 | oval | 82 | rectangular | 57.4 | 9.8% |
| H404AP | 100 | circular | 200 | rectangular | 50 | 19.6% |
| H401AP | 50 | square | 100 | rectangular | 25 | 25.0% |
| H049AP | 50 | raised (ridges) | 200 | lines | 75 | 25.0% |

The pillars can include a rounded cross section such as a circle, oval, square with rounded corners, or rectangle with rounded corners. The patterns can include the characteristics shown in the following table:

| Pattern | Shape (pillars) | Width L1 + L2 (μm) | Height/Depth L1 + L2 (μm) | Pitch L1 + L2 (μm) | Lattice | Calculated percent contact area |
|---|---|---|---|---|---|---|
| H374AP | oval & square | 41 × 20.5 + 200 | 57.4 + 100 | 82 + 933 | rectangular | 0.45% |
| H375AP | oval & square | 41 × 20.5 + 200 | 57.4 + 100 | 82 + 660 | rectangular | 0.9% |
| H376AP | oval & square | 41 × 20.5 + 200 | 57.4 + 100 | 82 + 443 | rectangular | 2% |
| H377AP | oval & square | 41 × 20.5 + 200 | 57.4 + 100 | 82 + 362 | rectangular | 3% |
| H378AP | oval & square | 41 × 20.5 + 200 | 57.4 + 100 | 82 + 280 | rectangular | 5% |
| H379AP | oval | 41 × 20.5 | 57.4 | 82 | rectangular | 9.8% |
| H002AP | round | 41 | 57.4 | 82 | rectangular | 19.6% |
| H404AP | circular | 82 | 41 | 164 | rectangular | 19.6% |

-continued

| Pattern | Shape (pillars) | Width L1 + L2 (μm) | Height/Depth L1 + L2 (μm) | Pitch L1 + L2 (μm) | Lattice | Calculated percent contact area |
|---|---|---|---|---|---|---|
| H401AP | square | 41 | 20.5 | 82 | rectangular | 25% |
| H049AP | ridges | 41 | 61.5 | 164 | lines | 25% |
| H008AH | Circular (holes) | 164 | 287 | 328 | triangular | 77.3% |
| Blank | N/A | N/A | N/A | N/A | N/A | 100 |

Figure 1B:
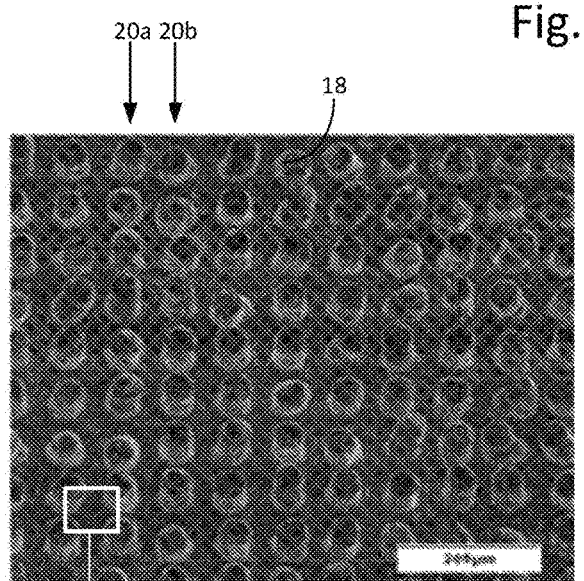
Figure 1C:
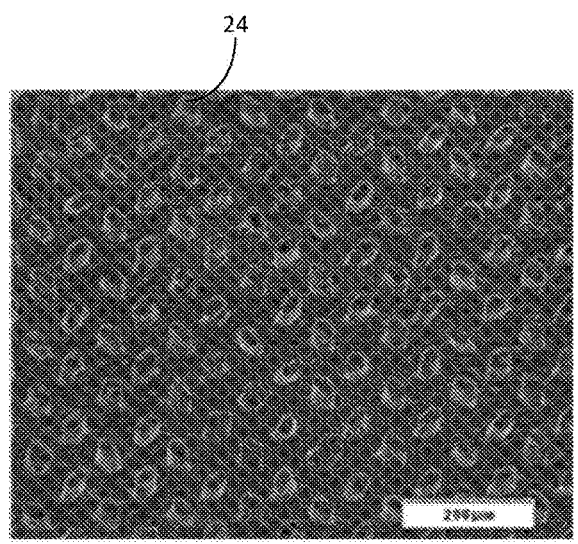
Figure 1D:
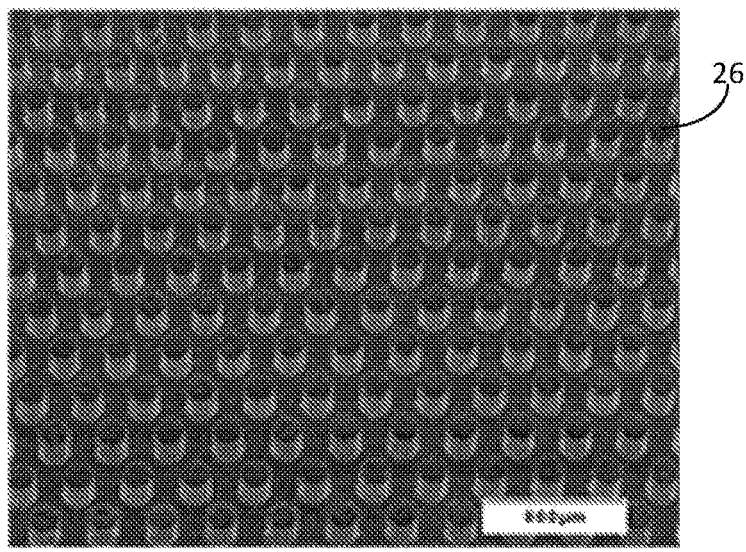
Figure 1E:
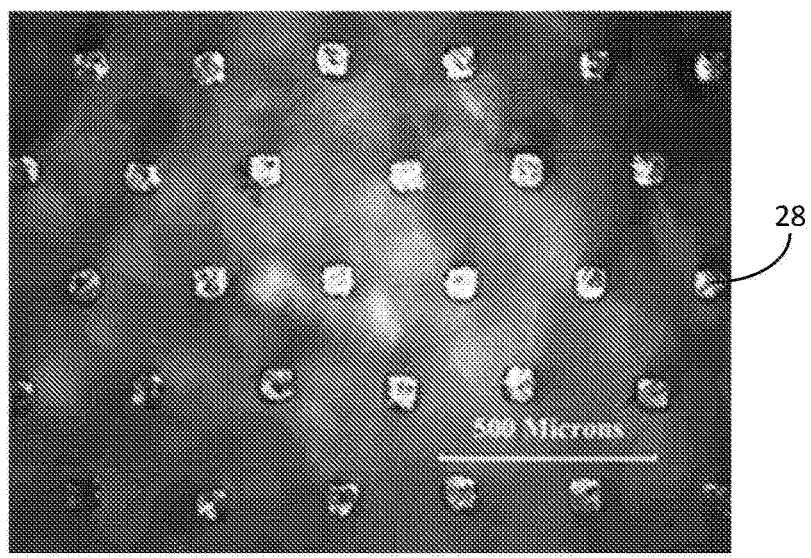
Figure 1F:
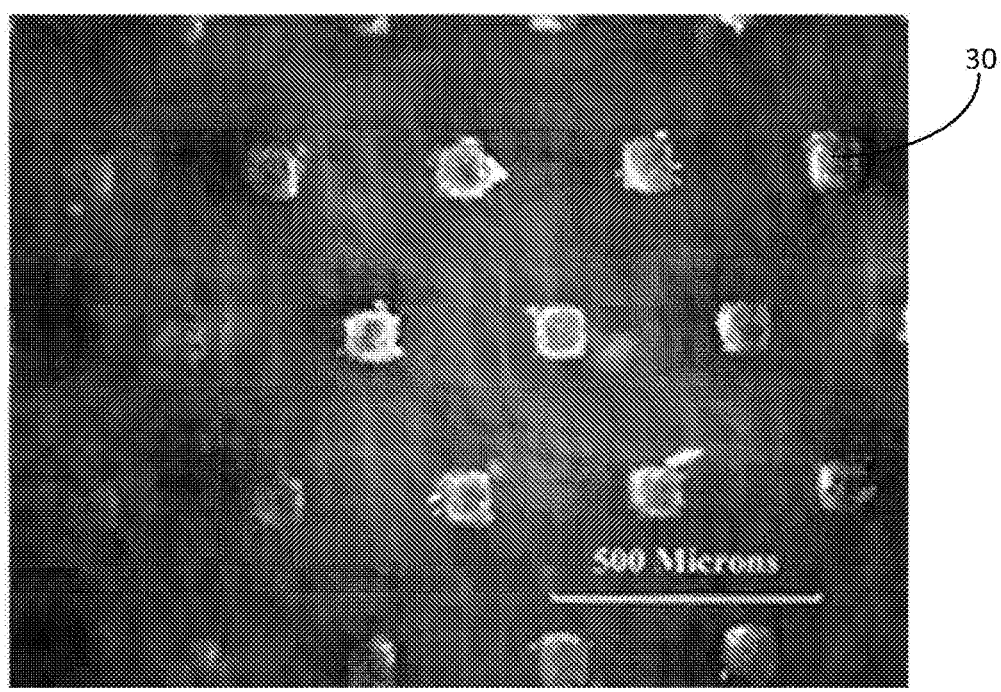
Figure 1G:
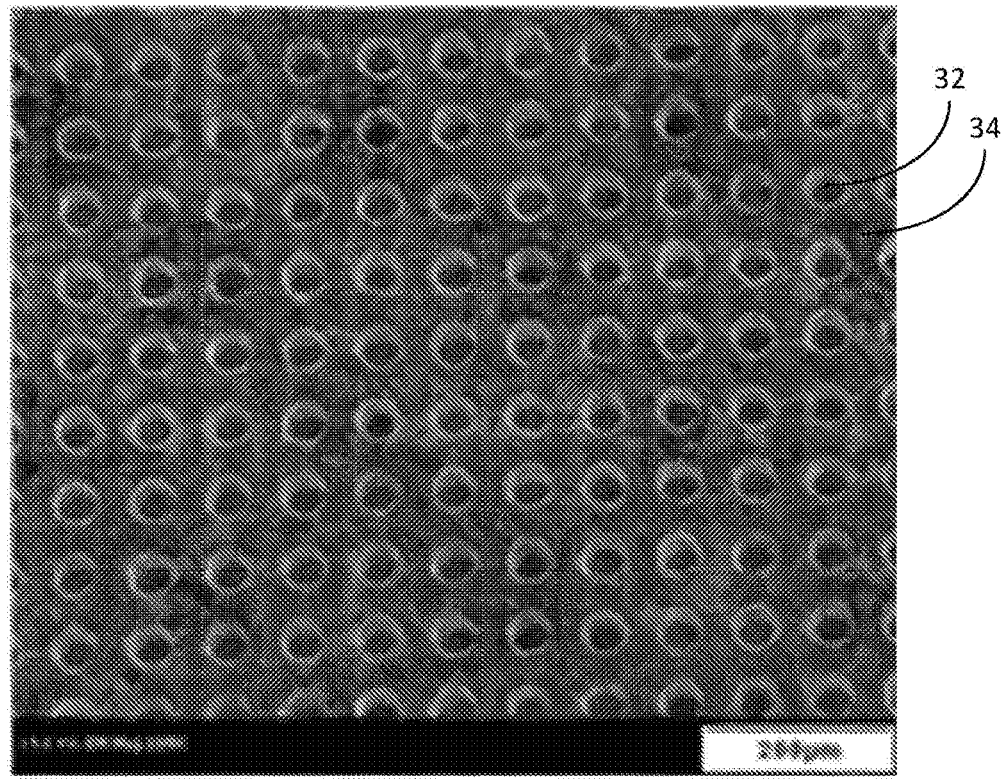
FIG. 1G shows a micrograph image of a microstructure arrangement including a plurality of recesses on a gripping surface material according to the present invention.

Referring to FIG. 1A, micro pattern H012CP is shown molded in stainless steel and includes an arrangement of square, rounded and oval shaped micro pillars 10 that, as shown, in an offset pattern with a first line 12 offset from a second line 14 resulting in a triangular lattice 16. In FIG. 1B, micro pattern H002AP is shown molded in stainless steel and includes an arrangement of mostly rounded shaped micro pillars 18. The pillars can be arranged in rows 20a and 20b referred to as a rectangular lattice 22. In FIG. 1C, micro pattern H003AP is shown molded in stainless steel and includes an arrangement of mostly oval shaped micro pillars 24 in offset rows with a triangular lattice. In FIG. 1D, micro pattern H008AP is shown molded in stainless steel and includes an arrangement of highly uniform rounded shaped micro pillars. Micro pattern H009AP (not pictured) is similar to the image in FIG. 1D of micro pattern H008AP except with slightly reduced dimension. The pillars 26 of this figure are rounded in an offset pattern and have generally uniform dimensions among the pillars. In FIG. 1E, micro pattern H021AP is shown molded in stainless steel and includes an arrangement of mostly square shaped micro pillars 28. In FIG. 1F, micro pattern H021AP also shown, but molded in Hytrel and includes an arrangement of mostly square shaped micro pillars 30 in an offset design. In FIG. 1G, micro pattern H008AH is shown molded in stainless steel and includes an arrangement of rounded holes 32 in the substrate 34. The holes can be arranged in a rectangular pattern. In referring to the dimensions, the depth of the holes are from the top of the substrate to the bottom of the hole, as opposed to referring to the height of the pillar relative to the substrate. In FIG. 2A, micro pattern H160AP is shown at 200× magnification as molded in stainless steel and includes an arrangement of rounded shaped micro pillars 38 arranged in an offset pattern. A plurality of secondary and generally smaller micro pillars 40 can be disposed on the top of the larger micro pillars 38. FIG. 2B is micro pattern H160AP shown at 500× magnification to illustrate the arrangement of the smaller micro pillars 40 arranged on the tops of the larger micro pillars 38. In one embodiment, the smaller micro pillars 40 can also be disposed along the sides of the pillars and on the substrate 42.

In one embodiment, the micro patterns were etched on silicon wafers, transferred to silicone rubber, molded into a powdered metal/binder compound, such as BASF Catamold 17-4 PH or 1001 steels, or into the plastic or rubber materials. In one embodiment, the molded powdered metal compound can be sintered to create the micro patterns on the steel surfaces. Some of the patterns can be modified using, electrical discharge machining, laser etching, or CNC milling and sawing to create additional features on the surface. Some methods of manufacturing are described in U.S. Pat. No. 8,720,047 incorporated by reference.

Figure 3:
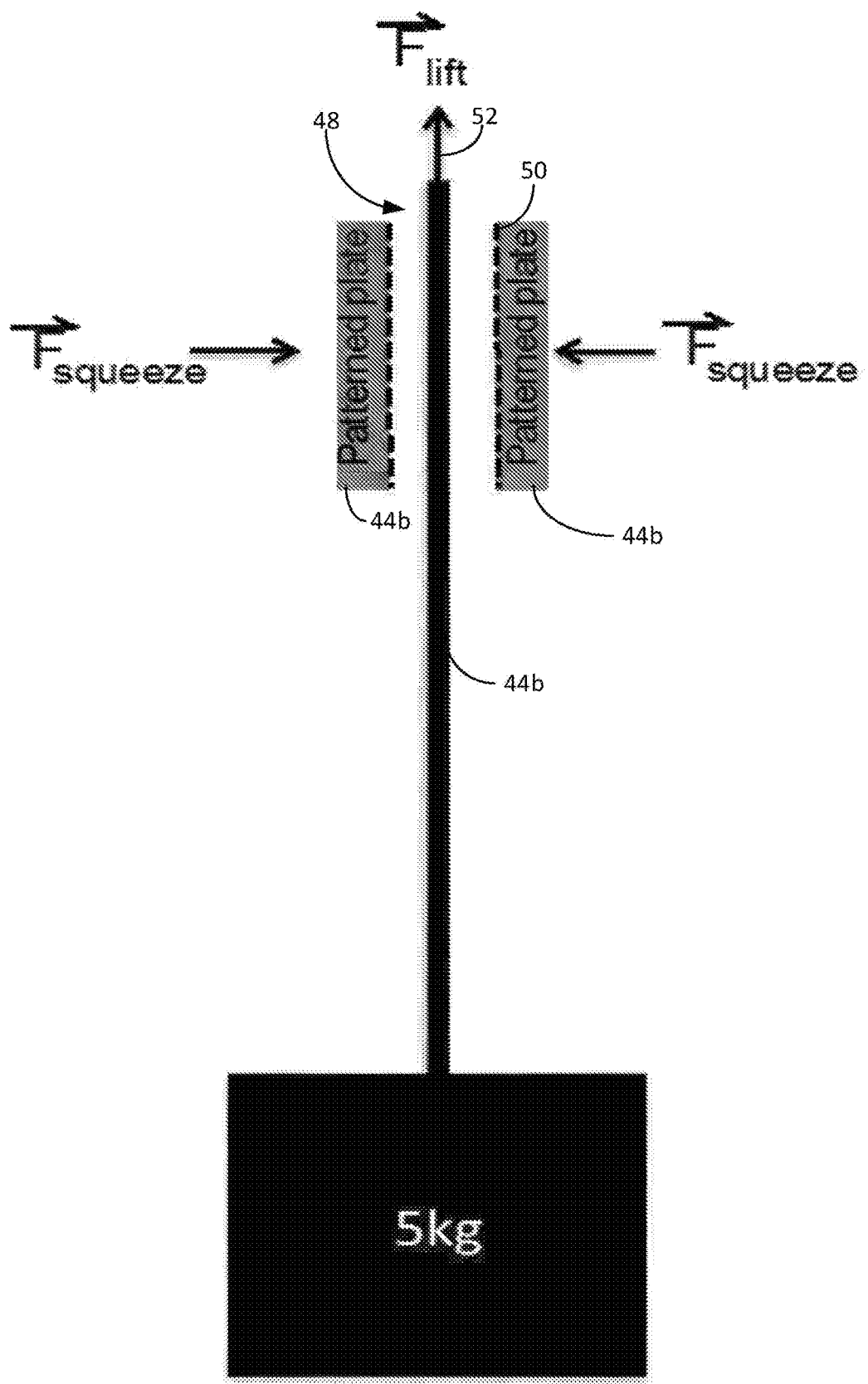
FIG. 3 shows a schematic for one testing method according to the present invention.

Referring to FIG. 3, a weighted testing method is shown. A clamp having a first jaw 44a and a second jaw 44b that can apply clamping force against a weighted member 46 having an outer surface 48. The inner surface 50 of the jaws can contact the outer surface of the weighted member and when the weighted member is pulled in a direction shown as 52, the friction between the weighted member and the clamp can be measured. Different gripping materials can be attached to the clamp jaws and the friction results can be measured as shown in the following table with the gripping levels arranged into three categories: (low, medium or high).

| Gripping material | PTFE | 40A Silicone | PET | TPE | Dry Skin | PP | PS |
|---|---|---|---|---|---|---|---|
| Sandpaper | Low | Medium | | | Medium | | |
| High Strength Tape | Medium | Low | | | | | |
| Tacky Foam | Low | Low | | Low | | | |
| Serrated Pliers | High With Damage | Medium | | High With Damage | Low | High With Damage | High With Damage |
| Smooth 17-4 PH Steel | Low | High | Low | Low | Low | Low | Low |
| Smooth Silicone (40A) | Medium | High | High | High | Low | High | |
| H012AP In 17-4PH Steel | High | Low | High | High | Low | High | High |
| H012AP In Polypropylene | Low | Low | Low | Low | Low | Low | Low |
| H160AP In 17-4PH Steel | High | High | High | High | High | High | High |

Figure 4:
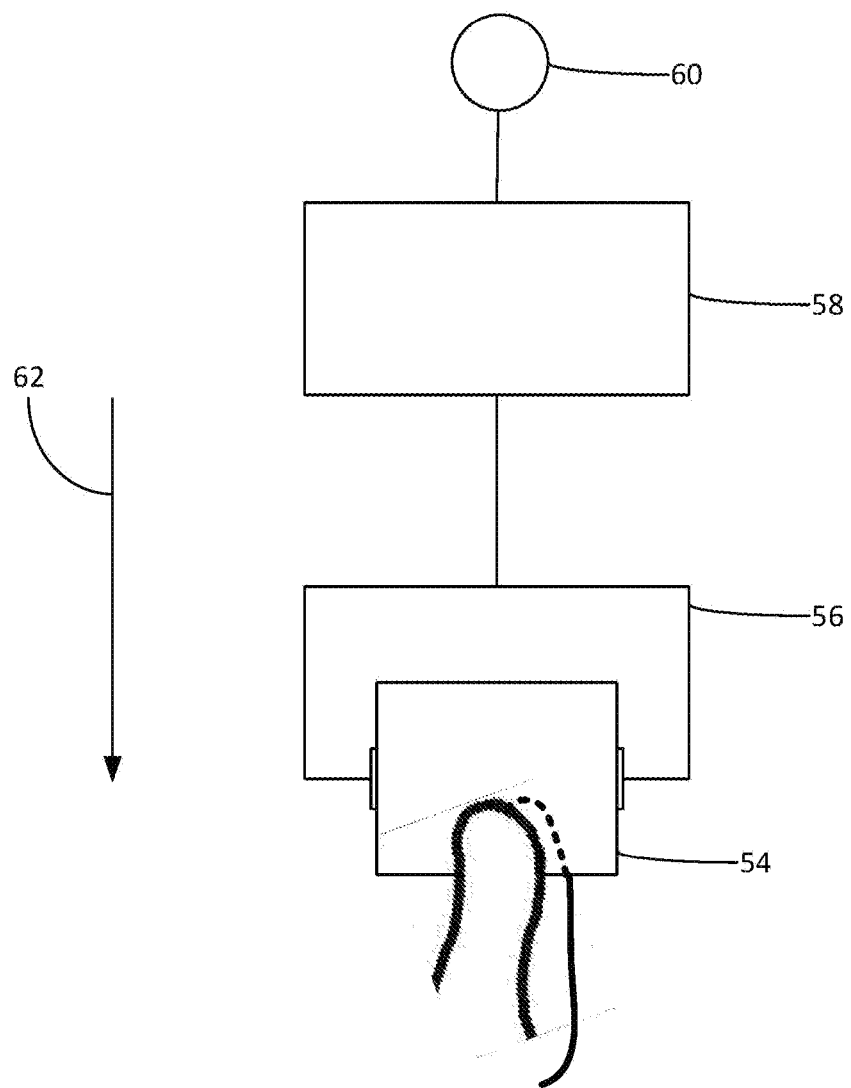
FIG. 4 shows a schematic for one testing method according to the present invention.
Figure 5:
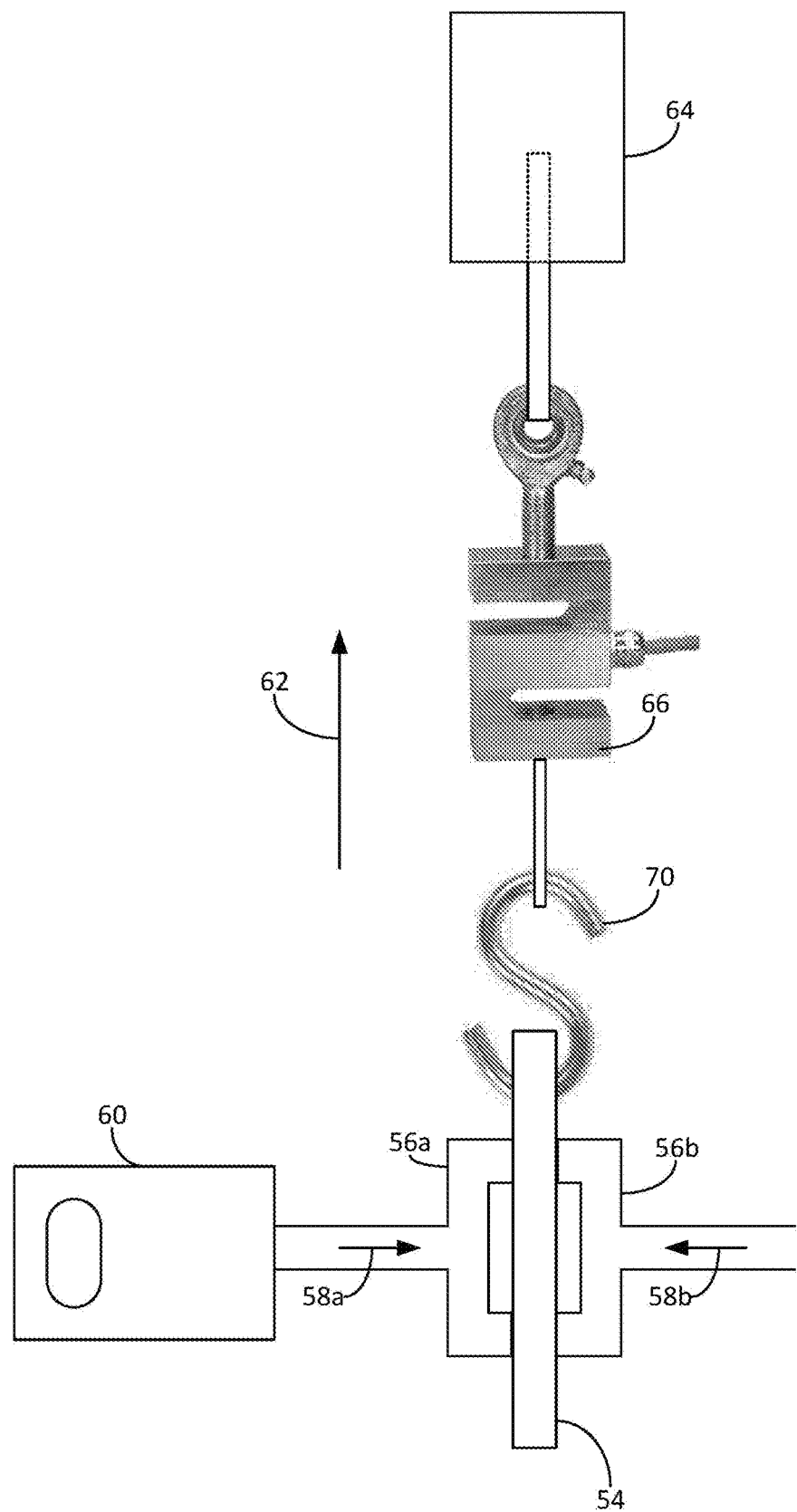
FIG. 5 shows a schematic for one testing method according to the present invention.

Referring to FIG. 4, the tactile properties of the various patterns were measured using a tactile testing method. Using this method, micro patterns were machined on a steel sample, a 1×1 inch samples in one embodiment with a blank sample of like dimensions used as a control. The sample 54 is held in clamp 56 which is in turn attached to a load cell 58. The load cell can be a 25lb load cell such as an S type or S-Beam load cell as provided by Omega Engineering, Inc. A test subject was asked to grip the sample. The load cell is fixed to an anchor point 60, in one embodiment. The test subject then grips the sample and pulls the sample generally in a direction shown as 62 and is requested to provide test results concerning the touch aesthetic as shown for each material and pattern in the following table.

| Pattern ID | Touch Aesthetic soft materials (Silicone, TPE, TPU) | Touch Aesthetic hard materials (Steel, Polypropylene) | DEPTH (μm) | % Contact |
|---|---|---|---|---|
| H190AP | soft, fuzzy, painless | Painful | 600 | 12.6% |
| H185AP | painless, prickly | Painful | 200 | 1.6% |
| H191AP | soft, fuzzy, painless | Painful | 450 | 8.7% |
| H282AP | smooth, painless | Comfortable | 70 | 5.6% |
| H034AP | painless | Comfortable | 40 | 9.8% |
| H037AP | painless | Comfortable | 40 | 10.0% |
| H002AP | painless, smooth | Comfortable | 70 | 19.6% |
| H003AP | painless, smooth | Comfortable | 70 | 9.8% |
| H012CP | painless, smooth | Comfortable | 50 | 25.0% |
| H008AH | smooth | Comfortable |  | 22.7% |
| H008AP | prickly | Painful | 350 | 77.3% |
| H009AP | prickly | Comfortable | 200 | 22.7% |
| H021AP | soft, fuzzy, painless | Painful | 400 | 9.4% |
| H160AP | smooth, painless | Comfortable | 20 + 200 | 5.0% |
| H374AP | prickly | Comfortable | 57.4 + 100 | 0.5% |
| H375AP | prickly | Comfortable | 57.4 + 100 | 0.9% |
| H376AP | prickly | Comfortable | 57.4 + 100 | 2.0% |
| H377AP | prickly | Comfortable | 57.4 + 100 | 3.0% |
| H378AP | prickly | Comfortable | 57.4 + 100 | 5.0% |
| H379AP | smooth, painless | Comfortable | 57.4 | 9.8% |
| H404AP | smooth, painless | Comfortable | 50 | 19.6% |
| H401AP | smooth, painless | Comfortable | 25 | 25.0% |
| H049AP | rigid, painless | Comfortable | 75 | 25.0% |

The grip force that was measured using the load cell with the measurement of the force on the sample required is pulled by the test subject until the samples slipped from between the fingers of the test subject. The peak force was measured in Newtons (N) for multiple trials and the average values (Average) and standard deviation calculated (SD) as shown below.

| Pattern ID (% Contact) | Grip Force in Newtons | | | | |
|---|---|---|---|---|---|
|  | Trial 1 | Trial 2 | Trial 3 | Average | SD |
| H374AP (0.45%) | 66 | 65 | 64 | 65.0 | 0.8 |
| H375AP (0.9%) | 75 | 72 | 69 | 72.0 | 2.4 |
| H376AP (2%) | 78 | 74 | 75 | 75.7 | 1.7 |
| H377AP (3%) | 76 | 74 | 71 | 73.7 | 2.1 |
| H378AP (5%) | 75 | 73 | 72 | 73.3 | 1.2 |
| H379AP (9.8%) | 68 | 67 | 66 | 67.0 | 0.8 |
| H002AP (19.6%) | 59 | 57 | 56 | 57.3 | 1.2 |
| H404AP (19.6%) | 55 | 58 | 58 | 57.0 | 1.4 |
| H401AP (25%) | 51 | 53 | 53 | 52.3 | 0.9 |
| H049AP (25%) | 44 | 44 | 48 | 45.3 | 1.9 |
| H008AH (77.3%) | 44 | 46 | 45 | 45.0 | 0.8 |
| Blank (100%) | 42 | 37 | 39 | 39.3 | 2.1 |

Figure 7:
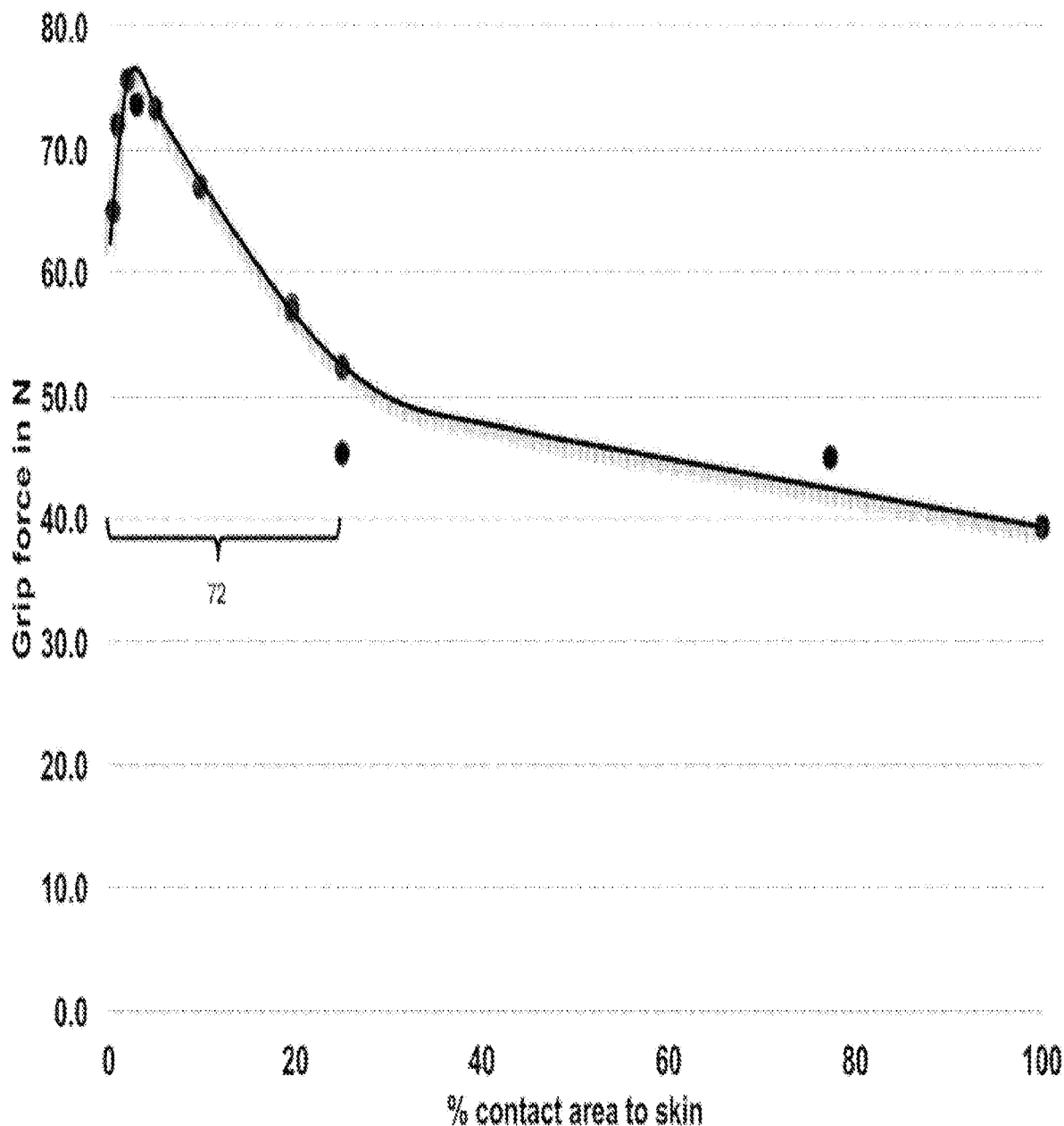
FIG. 7 shows a graphical representation of some of the novel physical properties and aspects of the present invention; and, FIG. 8A shows a perspective view of aspects of the present invention; and, FIG. 8B shows a top down view of aspects of the present invention.

Referring to FIG. 7, the graphical representation of this chart is shown for various patterns, one aspect of the novelty of the present invention can be shown. Conventional belief is that to accomplish sufficient friction between skin and an object, a contact area of twenty percent (20%) or more is needed. The contact area is the area of the finger, such as the finger tip, that is in contact with the surface. The present invention shows that with the micro patterns shown herein, the grip force (in Newtons) significantly increases with contact area between 0.25% and 25% as shown in section 72.

Materials tested for providing the samples using in the tactile testing included 17-4 PH stainless steel, Eastman Tritan modified PET, Dupont Hytrel modified PET, Momentive silicone rubber, 70 Shore A, NuSil silicone 40 Shore A. Low COF materials used in the tactile testing included polytetrafluoroethylene (PTFE), polyethylene (PE), polypropylene (PP), nylon, polyacetal resin (POM), polystyrene, polyesterterephthalate (PET), silicone rubber and human skin.

Referring to 5, the friction testing method is shown. The sample 54 is provided with a blank of the same or generally the same dimension as a control. The sample is secured between first clamping member 56a and second clamping member 56b and force applied in the respective directions 58a and 56b against the sample. The sample can have microstructures on the outer sides that can contact the clamping members. The force that is applied to the sample can be measured with a force gauge 60. The force gauge can be a NEXTECH 1000N model in one embodiment. The force applied to the sample between the clamping members can be tested at several levels or contact forces, including increments of 20N, 50N, 80N, 110N, and 120N. The sample can be retracted in direction 62 by retractor 64 with load cell 66 disposed between the sample and the retractor. The retraction rate can be 1 mm/second. The testing was performed and the averages tabulated as shown below in FIGS. 6A through 6J. The sample and load cell can be removably connected with connector 70, in one embodiment. The results of the friction test for certain materials and patterns are shown in the following table:

| Pattern ID | Coefficient of Friction for Each Material | | | |
|---|---|---|---|---|
|  | PTFE | SBR | Nylon | Silicone Rubber |
| smooth | 0.2 | 1.0 | 0.3 | 1.1 |
| H374AP | 0.7 | 1.3 | 1.0 | 1.0 |
| H375AP | 0.8 | 1.2 | 1.0 | 1.0 |
| H376AP | 0.9 | 1.4 | 0.9 | 1.1 |
| H377AP | 0.8 | 1.3 | 0.8 | 1.1 |
| H378AP | 0.7 | 1.3 | 0.8 | 1.1 |
| H379AP | 0.8 | 1.3 | 0.8 | 1.2 |

In the above table, the materials shown are polytetrafluoroethylene (PTFE, styrene-butadiene rubber (SBR), nylon and silicone rubber.

Figure 8A:
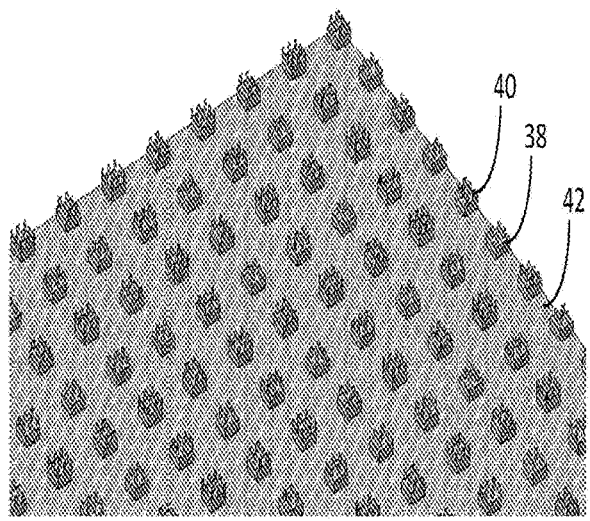
Figure 8B:
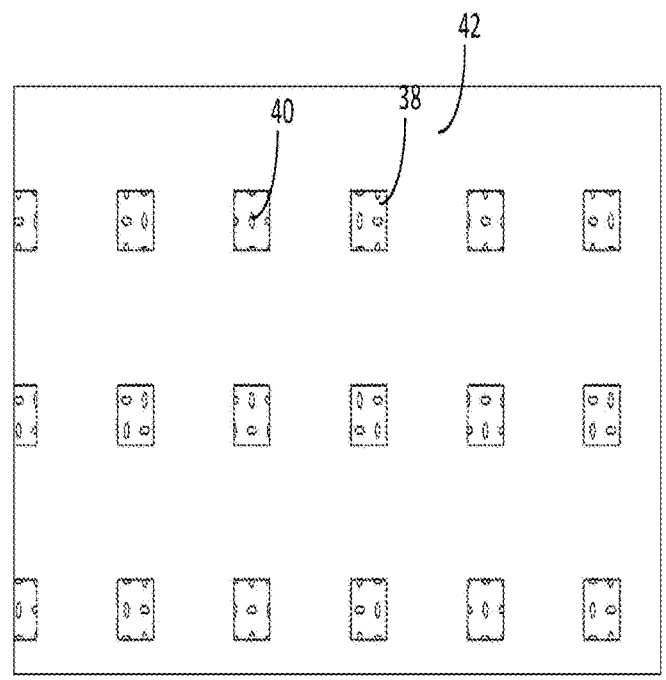

Referring to FIGS. 8A and 8B, the pattern designated H376AP is shown having a substrate 42 with a primary pattern 38 that can include a secondary pattern 40 disposed on the top of other outer surface of the primary pattern. The secondary pattern can be generally consistent from pillar to pillar of the primary pattern or can vary from pillar to pillar as illustrated. The rows can be inline (rectangular lattice) or offset (triangular lattice).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A microstructure arrangement for gripping a low coefficient of friction material comprising:
    a substrate disposed on a gripping surface wherein the substrate has a higher Young's modulus than the low coefficient of friction material to be gripped;
    a first set of pillars disposed on the substrate with each pillar having a cross section area in the range of 10 $\mu m^2$ to 400 $\mu m^2$, a height relative to the substrate in the range of 10 $\mu m$ to 400 $\mu m$, and a pitch determined from the center of the pillars in the range of 20 $\mu m$ to 1000 $\mu m$;
    a second set of pillars disposed on said first set of pillars with each pillar of said second set of pillars having a cross section area less than that of the pillars in said first set of pillars;
    wherein said second set of pillars are defined by pillars each having a cross section width from 0.5 $\mu m$ to 100 $\mu m$, a height of from 1 $\mu m$ to 100 $\mu m$, and a pitch determined from the center of the second set of pillars in the range of 1 $\mu m$ to 200 $\mu m$;
    wherein said first and second set of pillars are configured to cooperate to have the physical property of a grip force in excess of 50.0N with a contact area of 25% or less, as determined by the friction testing method; and,
    wherein said first and second set of pillars are configured to cooperate to have a coefficient of friction in the range of about 0.7 to about 1.4.

2. The microstructure arrangement of claim 1 wherein said grip force is in excess of 55.0N with a contact area of 20% or less.

3. The microstructure arrangement of claim 1 wherein the grip force in excess of 60.0N with a contact area of 10% or less.

4. The microstructure arrangement of claim 1 wherein said substrate is formed from the material selected from the group consisting of steel, polyester terephthalate, and modified polyester terephthalate.

5. The microstructure arrangement of claim 4 wherein said substrate is steel and the material to be gripped is polytetrafluoroethylene, and wherein said substrate with said first and second set of pillars has a coefficient of friction in the range of 0.7 to 0.9 against said polytetrafluoroethylene.

6. The microstructure arrangement of claim 4 wherein said substrate is steel and the material to be gripped is styrene-butadiene rubber, and wherein said substrate with said first set and second of pillars has a coefficient of friction of about 1.4 against said styrene-butadiene rubber.

7. The microstructure arrangement of claim 4 wherein said substrate is steel and the material to be gripped is Nylon, and wherein said substrate with said first and second set of pillars has a coefficient of friction of about 1.0 against said Nylon.

8. The microstructure arrangement of claim 1 wherein said first set of pillars have an angle of orientation to said substrate of greater than 75 degrees.

9. A microstructure arrangement for gripping a low coefficient of friction material comprising:
    a substrate disposed on a gripping surface wherein the substrate has a higher Young's modulus than the low coefficient of friction material to be gripped, and wherein the substrate has a coefficient of friction relative to a polymer against steel of about 0.2 or less without any microstructure arrangement;
    at least a first set of pillars carried on the substrate with each pillar having a cross section area in the range of 10 $\mu m^2$ to 400 $\mu m^2$, a height relative to the substrate in the range of 10 $\mu m$ to 400 $\mu m$, and a pitch determined from the center of the pillars in the range of 20 $\mu m$ to 1000 $\mu m$; and,
    wherein the at least said first set of pillars define a microstructure arrangement on said substrate configured to provide a coefficient of friction in the range of about 0.7 to about 1.4 against a polymer with said substrate made of steel.

10. The microstructure arrangement of claim 9 wherein the material to be gripped is selected from the group consisting of polytetrafluoroethylene, styrene-butadiene rubber, nylon, high-density polyethylene, polyethylene, polypropylene, polyester terephthalate, polyacetal resin, silicone rubber, isoprene rubber, thermoplastic elastomers and polyurethane rubbers.

11. The microstructure arrangement of claim 9 wherein said at least said first set of pillars covers at least about 25% of the surface area of a gripping side of said substrate.

12. The microstructure arrangement of claim 9 wherein said at least said first set of pillars have a generally uniform height from the surface of said substrate.

\* \* \* \* \*